US008552832B2

(12) United States Patent
Kohanek

(10) Patent No.: US 8,552,832 B2
(45) Date of Patent: Oct. 8, 2013

(54) SYSTEM AND METHOD FOR INTERACTIVE APPLIANCE CONTROL

(75) Inventor: Jeffrey Kohanek, Westminster, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 13/442,183

(22) Filed: Apr. 9, 2012

(65) Prior Publication Data

US 2012/0212680 A1  Aug. 23, 2012

Related U.S. Application Data

(63) Continuation of application No. 11/967,452, filed on Dec. 31, 2007, now Pat. No. 8,154,381.

(51) Int. Cl.
G05B 23/02 (2006.01)

(52) U.S. Cl.
USPC ......... 340/3.1; 340/3.7; 340/3.71; 340/13.24; 348/14.05; 398/107; 725/38; 725/40; 725/49

(58) Field of Classification Search
USPC ............ 340/3.1, 3.7, 3.71, 13.24; 348/14.05; 398/107; 725/38, 40, 49
See application file for complete search history.

(56) References Cited

U.S. PATENT DOCUMENTS

| 4,623,887 | A | 11/1986 | Welles, II |
| 4,774,511 | A | 9/1988 | Rumbolt et al. |
| 4,959,810 | A | 9/1990 | Darbee et al. |
| 6,466,233 | B1 | 10/2002 | Mitani |
| 6,473,135 | B1 * | 10/2002 | Iwamura ........................ 348/706 |
| 7,102,616 | B1 | 9/2006 | Sleator |
| 7,155,305 | B2 | 12/2006 | Hayes et al. |
| 7,167,122 | B2 | 1/2007 | Stefanik |
| 7,394,451 | B1 | 7/2008 | Patten et al. |
| 2002/0089427 | A1 * | 7/2002 | Aratani et al. ........... 340/825.72 |
| 2002/0194596 | A1 * | 12/2002 | Srivastava ........................ 725/37 |
| 2004/0070491 | A1 * | 4/2004 | Huang et al. .................. 340/10.5 |
| 2004/0148632 | A1 * | 7/2004 | Park et al. ........................ 725/81 |
| 2005/0102699 | A1 * | 5/2005 | Kim et al. ........................ 725/81 |
| 2006/0041655 | A1 | 2/2006 | Holloway et al. |
| 2006/0066716 | A1 * | 3/2006 | Chang ........................ 348/14.05 |
| 2006/0161865 | A1 | 7/2006 | Scott et al. |

(Continued)

FOREIGN PATENT DOCUMENTS

| EP | 1521453 A1 | 4/2005 |
| JP | 2006203391 A2 | 8/2006 |
| JP | 2006217292 A2 | 8/2006 |

OTHER PUBLICATIONS

European Patent Office Communication, Dated Dec. 20, 2012, Application No./Patent No. 08866412.3-1246 / 2225618 PCT/US2008080100, 7 pgs.

Primary Examiner — Jennifer Mehmood
Assistant Examiner — Andrew Bee
(74) Attorney, Agent, or Firm — Greenberg Traurig, LLP

(57) ABSTRACT

A controlling device interacts dynamically with a plurality of appliances using state information known to a master appliance. The master appliance conveys to the controlling device the state information and the controlling device uses the state information to dynamically configure itself to command functional operations of one or more of the plurality of appliances. The master appliance also causes a graphical representation of the current configuration of the controlling device to be displayed on a display device that is associated with the master appliance.

9 Claims, 7 Drawing Sheets

(56) References Cited

U.S. PATENT DOCUMENTS

2006/0256371 A1* 11/2006 King et al. .................. 358/1.15
2007/0136778 A1* 6/2007 Birger et al. .................. 725/117
2007/0229465 A1* 10/2007 Sakai et al. .................. 345/173
2007/0273790 A1* 11/2007 Sakata et al. .................. 348/552

* cited by examiner

SYSTEM AND METHOD FOR INTERACTIVE APPLIANCE CONTROL

RELATED APPLICATION

This application claims the benefit of and is a continuation of U.S. application Ser. No. 11/967,452, filed on Dec. 31, 2007, the disclosure of which is incorporated herein by reference in its entirety.

BACKGROUND

Universal controlling devices, that is, for example, remote controls which are adaptable to issue commands to a multiplicity of appliances of different type and/or manufacture, and the features and functionality provided by such controlling devices are well known in the art. Such controlling devices may be "learners" that is, adapted to capture, store, and subsequently play back the command signals of the original equipment remote controls corresponding to the appliances to be controlled, for example, as described in U.S. Pat. No. 4,623,887; or they may include preprogrammed libraries of command codes, for example, as described in U.S. Pat. Nos. 4,774,511 or 4,959,810.

For commanding the operation of multiple appliances using a single universal controlling device, a conventional controlling device typically comprises multiple device mode states. In each device mode state, the universal controlling device is configured to command the operation of one or more designated appliances. By way of example, a typical universal remote control may be placed into one of the multiple device mode states through actuation of a corresponding device mode key. The actuation of such a device mode key functions to configure the universal remote control to transmit command codes to the one or more appliances that have been designated to the device mode state corresponding to the actuated device mode key.

By way of further example, a simple universal remote control may include device mode selection keys labeled "TV," "DVD," "CBL," and "Audio." When the TV device mode key is actuated, the remote control may be placed into a "TV" device mode state wherein it is configured to transmit commands to a TV device in response to key activations (e.g., activation of a channel up/down key causes a transmission of a channel up/down command recognizable by the TV), when the CBL device mode key is actuated the remote control may be placed into a "CBL" device mode state wherein it is configured to transmit commands to a cable set top box device in response to key activations (e.g., activation of the same channel up/down key causes a transmission of a channel up/down command recognizable by the cable set top box), and so on. It will be appreciated that for the sake of user convenience each of these device mode states may, however, incorporate certain keys adapted to transmit commands to a device other than the primary device of that device mode state, e.g., the controlling device may be configured such that, for example when in the CBL device mode state, the volume keys may continue to transmit commands in a format appropriate for a given TV or Audio device, etc.

One drawback of such an arrangement is that is incumbent upon the user of the controlling device to be aware of, and if necessary reselect, an appropriate device mode state prior to issuing operating commands to each of the controlled appliances. All too frequently users may forget or overlook this step, resulting in an unintended action being performed by the wrong device.

A further shortcoming of such controlling devices is that user input elements, for example keys on a universal remote control, may initiate different command functions in different device modes. For example, a user input element which initiates a program guide display when in the "CBL" device mode may initiate a setup/configuration menu when in the "TV" device mode. Additionally, even though a user of the controlling device may only require a limited set of functions during normal viewing activities, a typical universal controlling device is equipped with sufficient user input elements to support all required functions, even those that that are used infrequently and/or only at certain stages (e.g., selection of programming source during preparation for viewing.) The prevalence of such key clutter is yet another source of user confusion. To alleviate this confusion various methods/configuration have been used in the art, for example, e.g., color-coding keys, grouping seldom used input elements under a cover or lid, etc.

SUMMARY OF THE INVENTION

This invention relates generally to a controlling device which interacts dynamically with a controlled appliance, preferably one through which source media input switching is performed (i.e., a "master appliance"). Based upon a knowledge of which source is currently selected as the media input and the operational status of the master appliance itself and other connected appliances, the master appliance may convey information to the controlling device indicative of a desired device mode state and in some embodiments, of what functions from the internal library of command codes of the controlling device are to be assigned to various user input elements on the controlling device. Further, the master appliance may cause a graphical representation of the currently-assigned input element functionality to be displayed on a connected display, e.g. a television screen, particularly in the event that the master appliance itself does not include a display device. In this manner, a simplified controlling device may be provided with a reduced number of input elements which are dynamically assigned appropriate functionality and device mode states according to the operational context of the equipment to be controlled.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to a preferred embodiments shown in the attached drawings in which.

DETAILED DESCRIPTION

Figure 1:
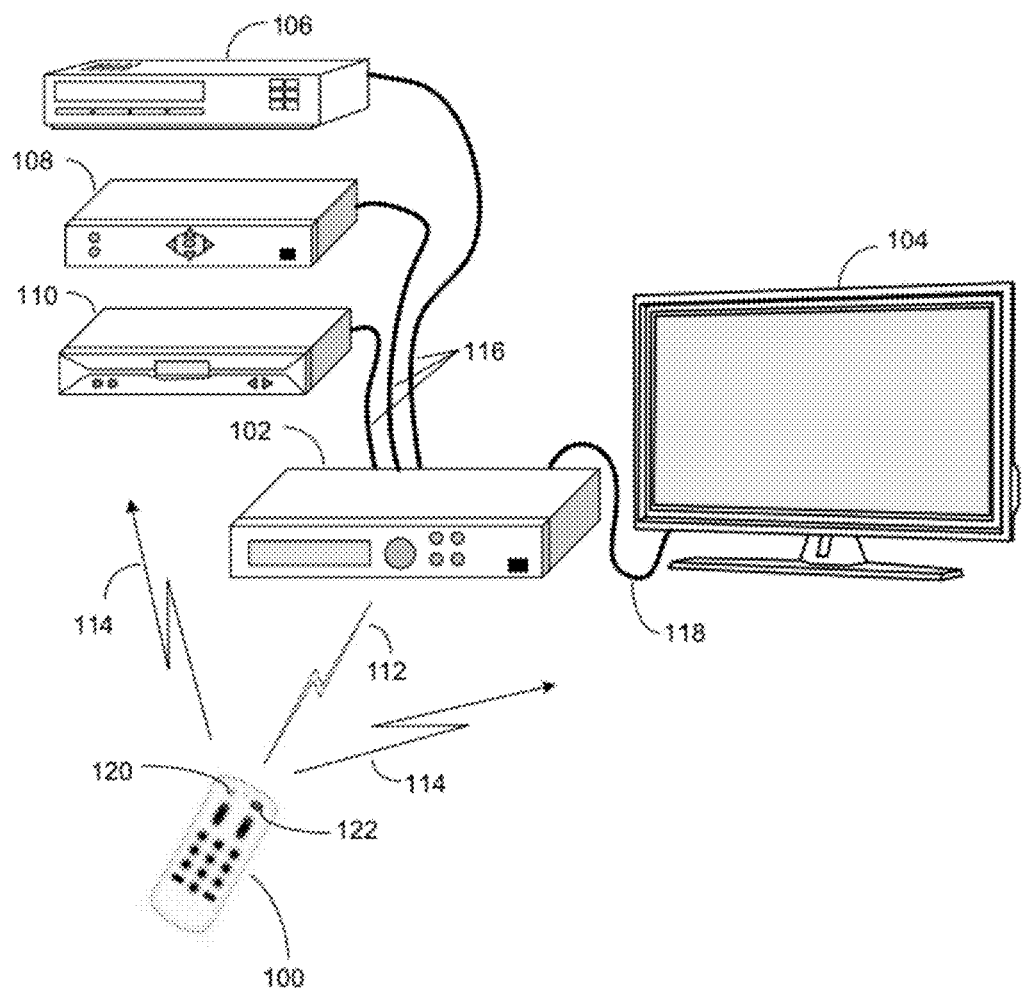
FIG. 1 illustrates an exemplary system in which an exemplary controlling device and master appliance according to the instant invention may be used.

The following describes a system and methods for dynamically configuring a controlling device such as a universal remote control to command one or more functions of one or more types of appliances. By way of example, FIG. 1 illustrates an exemplary system wherein a controlling device 100 supplied together with an audio/visual (A/V) receiver device 102 may be used to command functions of various appliances that are in communication with the A/V receiver 102, such as by providing input and/or by receiving output, illustrated as a TV set 104, a cable STB 106, a PVR 108 and a DVD player 110. The A/V outputs 116 of appliances 106 thru 110 are routed through A/V receiver 102. The video signal 118 currently being delivered to TV 104 is selected by A/V receiver 102 from the available sources 116. (For clarity, other connections, e.g., A/V inputs to the PVR, audio signal routing to speakers, etc. are not shown.) While illustrated in the context of an A/V receiver 102, a television 104, a STB 106, a PVR 108 and a DVD player 110, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. It will also be appreciated that, while in the illustrative embodiment the A/V receiver 102 is configured to function as the aforementioned master appliance, in alternative embodiments this function may be equally well performed by any other appliance, preferably one equipped with A/V switching capability such as for example an advanced cable or satellite set top box or combo DVR, a personal computer, etc. Accordingly, it is contemplated that in certain instances any of the television 104, STB 106, PVR 108 or DVD player 110 could also function as the master appliance.

In the embodiment illustrated, controlling device 100 communicates with A/V receiver 102 via a two-way radio frequency (RF) link 112 and with other appliances to be controlled (104, 106, 108, 110) via a unidirectional infrared (IR) link 114, however, as is known in the art controlling device 100 may be capable of communicating with the appliances using any convenient IR, RF, point-to-point, or networked protocol to cause the appliances to perform operational functions, provided the control protocols and command values to be used in communicating with a desired appliance are known to the operational software of controlling device 100.

Figure 2:
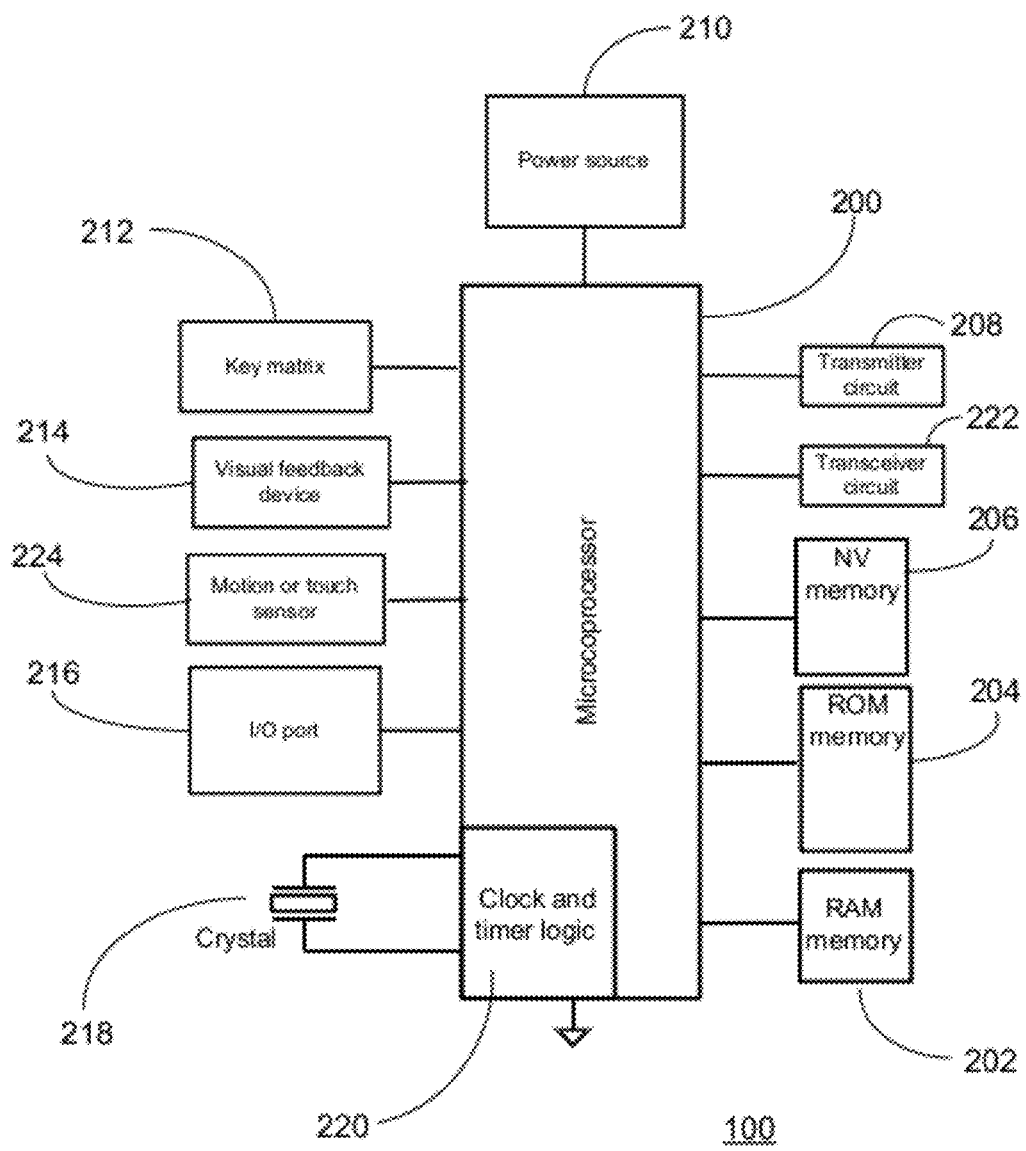
FIG. 2 illustrates a block diagram of exemplary components of the exemplary controlling device of FIG. 1.

With reference to FIG. 2, for use in commanding the functional operations of one or more appliances, the controlling devices 100 may include, as needed for a particular application, a processor 200 coupled to a ROM memory 204, a RAM memory 202, a key matrix 212 (e.g., hard keys, soft keys such as a touch sensitive surface overlaid on a liquid crystal (LCD) or an electroluminescent (EL) display, or some combination thereof), transmission circuit(s) 208 and/or transceiver circuit(s) 222 (e.g., IR and/or RF), a non-volatile read/write memory 206, a means 214 to provide feedback to the user (e.g., one or more LEDs, LCD display, speaker, and/or the like), a power source 210, an input/output port 216 such as a serial interface, modem, USB port, etc., a motion or touch sensor 224 to detect when controlling device 100 is being handled by a user, and clock and timer logic 220 with associated crystal or resonator 218.

As will be understood by those skilled in the art, some or all of the memories 202, 204, 206 may include executable instructions (collectively, the program memory) that are intended to be executed by the processor 200 to control the operation of the remote control 100, as well as data that serves to define the aforementioned control protocols and command values to the operational software (collectively, the command data). In this manner, the processor 200 may be programmed to control the various electronic components within the remote control 100, e.g., to monitor the power supply 210, to cause the transmission of signals, control visual feedback device(s) 214, etc. All or part of the non-volatile read/write memory 206, for example an EEPROM, battery-backed up RAM, FLASH, Smart Card, memory stick, or the like, may additionally be used to store setup data and parameters as necessary. While the memory 204 is illustrated and described as a ROM memory, memory 204 may also be comprised of any type of readable media, such as ROM, FLASH, EEPROM, or the like. Preferably, the memories 204 and 206 are non-volatile or battery-backed such that data is not required to be reloaded after battery changes. In addition, the memories 202, 204 and 206 may take the form of a chip, a hard disk, a magnetic disk, an optical disk, and/or the like. Still further, it will be appreciated that some or all of the illustrated memory devices may be physically incorporated within the same IC chip as the microprocessor 200 (a so called "microcontroller") and, as such, they are shown separately in FIG. 2 only for the sake of clarity.

To cause the controlling device 100 to perform an action, controlling device 100 is adapted to be responsive to events, such as a sensed user interaction with the key matrix 212, activation of motion or touch sensor 224, etc. In response to an event, appropriate instructions within the program memory (hereafter the "operating program") may be executed. For example, when a function key is actuated on the controlling device 100, the controlling device 100 may retrieve from the command data the command value and control protocol currently assigned to the actuated function key and the currently assigned device mode, from memory 202, 204, and/or 206, and transmit the command to an intended target appliance, e.g., the STB 106, in a format recognizable by the intended target appliance.

For selecting a set of command data to be associated with an appliance to be controlled, data may be entered into the controlling device 100 that serves to identify an intended target appliance by its type and make (and sometimes model). Such data allows the controlling device 100 to identify the appropriate command data within a preprogrammed library of command data that is to be used to transmit recognizable commands in a format appropriate for such identified appliances. Since methods for setting up a controlling device to command the operation of specific home appliances are well-known, such methods need not be described in greater detail herein. Nevertheless, for additional information pertaining to setup procedures, the reader may turn, for example, to U.S. Pat. Nos. 4,959,810, 5,614,906, and 6,225,938 which describe self-contained setup of controlling devices, U.S. patent application Ser. Nos. 09/804,623 and 09/615,473 which describe setup of controlling devices by interaction with a Web site, or U.S. patent application Ser. No. 11/515, 962 which describes setup of a controlling device by interacting with an appliance such as, for example, a set top box. It will also be appreciated that the controlling device 100 may be set up to command operations of an appliance 102, 104, or 106 by being taught the command codes needed to command such appliance as described in U.S. Pat. No. 4,623,887. Still further, it will be understood that command data may be pre-stored in the controlling device 100 or the controlling device 100 may be upgradeable, for example, via use of external input port 216 as described for example in the aforementioned U.S. Pat. No. 4,959,810.

Figure 3:
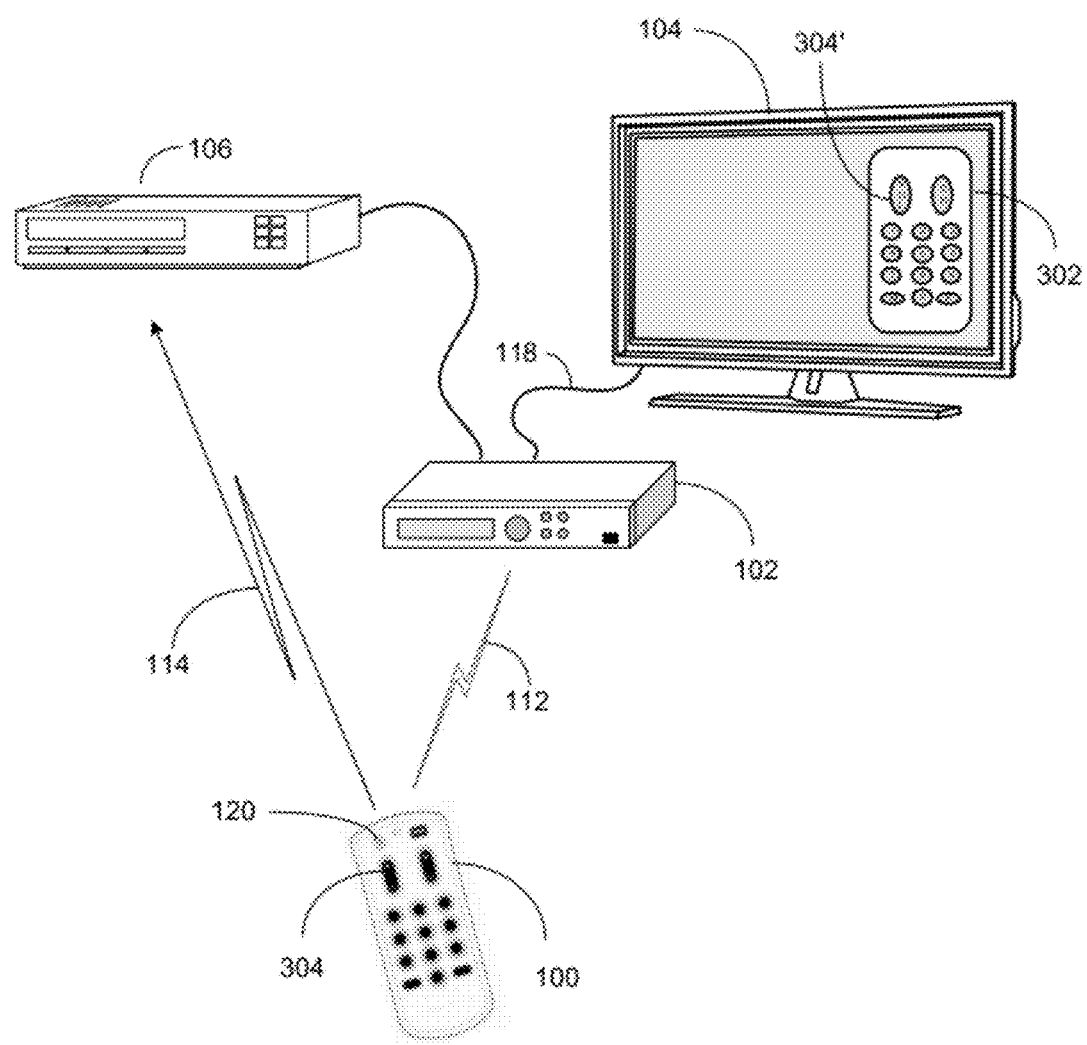
FIG. 3 illustrates the exemplary system of FIG. 1 in which a cable STB is selected as an audio/visual (A/V) source device.

Turning now to FIG. 3, there is illustrated the system of FIG. 1 in which cable STB 106 has been selected by the user as the current input source of A/V content to A/V receiver 102. (For the sake of clarity, non-participating appliances 108 and 110 are not shown in this view.) As will be explained in further detail in conjunction with the flowchart of FIG. 4, selection of cable STB 106 as the current source for A/V receiver 102 causes A/V receiver 102, acting as the master appliance, to configure controlling device 100 via RF link 112 to issue key commands via IR link 114 in a format recognizable by cable STB 106. A/V receiver 102 also causes a visual representation 302 of the current key function assignments just communicated to controlling device 100 to be superimposed on the signal being provided to TV 104 via video output connection 118. It is to be understood that the terms "key" or "key function" as used in this context and within this document are intended to broadly encompass controlling device user input elements in general, including without limitation physical buttons, touch screen icons, scroll wheels, motion or gesture sensors, pressure sensitive devices, voice recognition elements, etc.

It will be appreciated that the functionality of certain keys of controlling device 100 may not be changed during this process: for example volume adjustment key(s) 304 may continue to issue commands directed to A/V receiver 102. Alternatively, alternative appliance functions may be assigned to certain keys by the master appliance, for example keys 304 may be assigned to transmit TV volume adjustment commands when the cable STB is selected as the current input as shown to the user within the display as keys 304'. In certain embodiments, such assignments may be dynamic: for example when A/V receiver 102 detects that the incoming audio signal from cable STB 106 is Dolby 5.1 encoded it may route the audio output through its surround sound speaker system and when the incoming audio signal is determined to be simple 2-channel stereo A/V receiver 102 may instead route the audio output to TV 104 to be rendered by its internal speakers, while dynamically assigning the intended recipient of volume control commands to be transmitted by the controlling device 100 to match this routing. Further, controlling device 100 may also include a "home" key 120 which is always available to communicate a signal to the master appliance to request that key function assignments be restored to state whereby commands to be issued from the controlling device 100 would be appropriate for the master appliance, e.g., in order to select a different appliance as the input, adjust sound field settings, etc.

Figure 7:
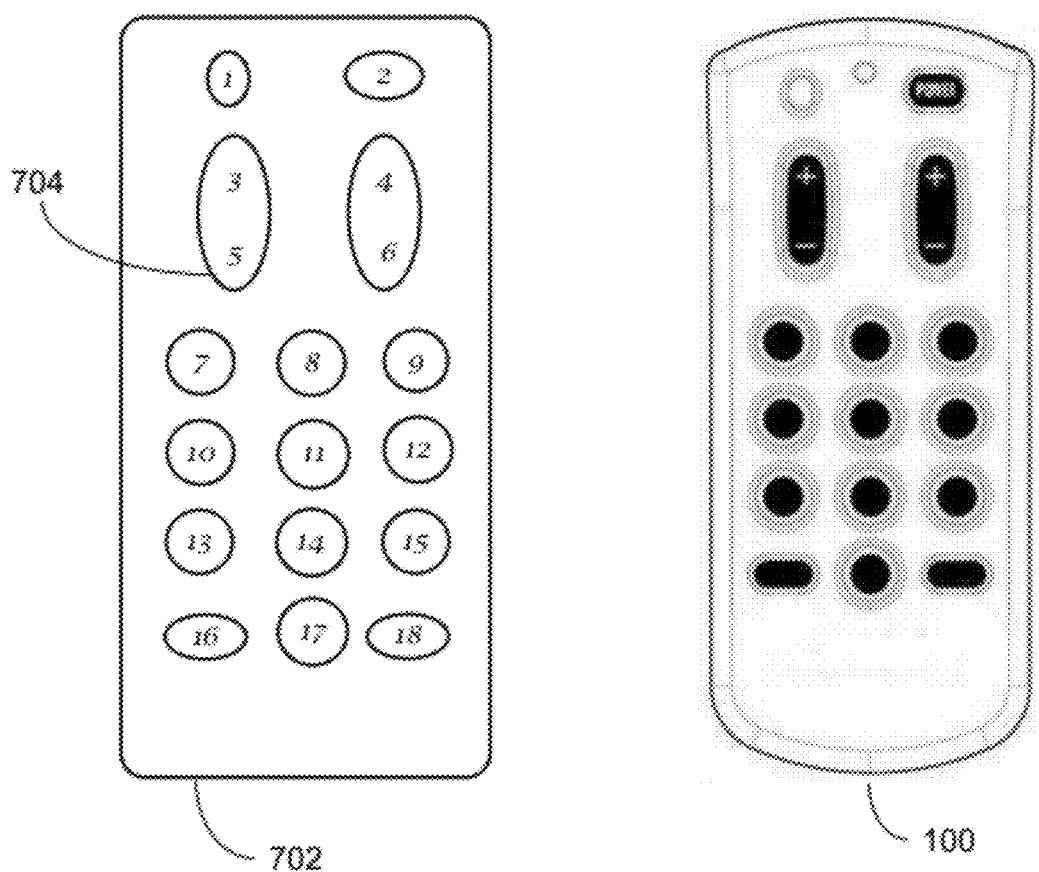
FIG. 7 illustrates an exemplary numbering scheme for use in assigning command functions to keys of a controlling device.

In order to efficiently convey key function configuration information from a master appliance 102 to a controlling device 100, a common function and device type reference numbering scheme may be established. Any convenient system may be used including without limitation that described in commonly assigned U.S. Pat. No. 6,781,518 entitled "Digital Interconnect of Entertainment Equipment," which patent is incorporated herein by reference in its entirety. When combined with a mutually understood numbering scheme for the buttons or other input elements of a controlling device 100, each key function assignment may be compactly expressed in the form: Button number:Device type number: Function number. By way of example, in the system of the above referenced U.S. Pat. No. 6,781,518, a TV appliance is assigned type category 00, and the volume down function is assigned function number 03. An exemplary key numbering scheme 702 which may be applied to controlling device 100 is illustrated in FIG. 7. Thus, using these exemplary values, in order to assign to key 704, corresponding to referenced key number five, a TV volume down function, i.e., to configure the controlling device to issue a volume down command in a format recognizable by the TV in response to actuation of referenced key number 5, the assignment string provided to the controlling device 100 might be "05:00:03". It will be appreciated that in order to perform multiple key function assignments, several such strings may be concatenated together and transmitted to a controlling device 100 from the master device as a block of data, using any convenient communication protocol, encoding, and modulation scheme as are well known in the art. In an illustrative embodiment, this key assignment data may be transmitted to the controlling device only when changes are made to the assignments by the master appliance. The received assignments may thus be stored within a controlling device which may continue to use these values for the processing of all subsequent key press activity until an updated assignment is received. It will be appreciated, however, that other arrangements may be used as appropriate for a particular embodiment, for example key assignments may be transmitted to a controlling device every time it becomes active (as described hereafter in conjunction with FIG. 4), may be refreshed after every keystroke or at fixed time intervals, etc.

Figure 4:
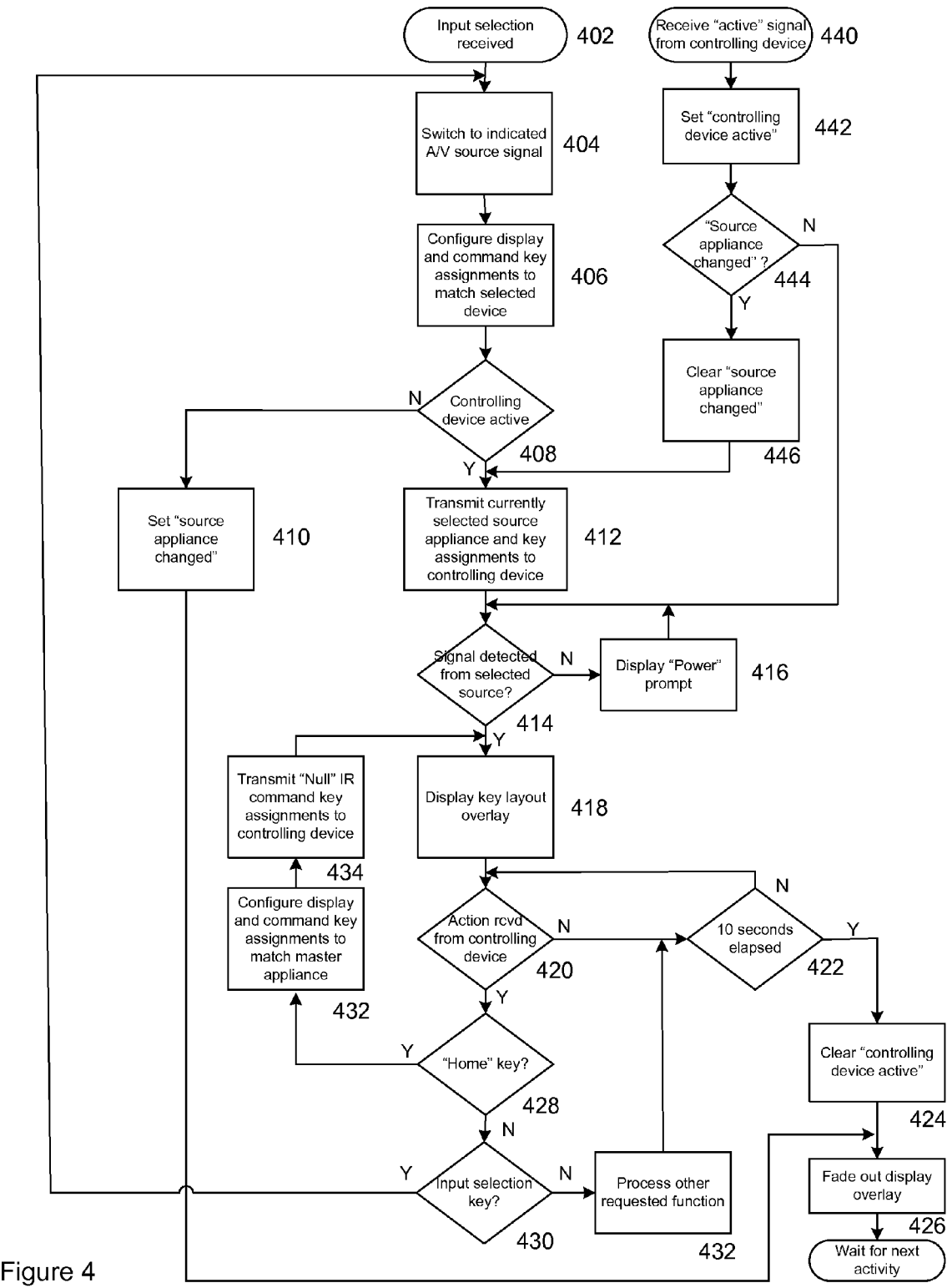
FIG. 4 illustrates in flow chart form exemplary actions of an exemplary master appliance operating according to the teachings of the instant invention.

Turning now to FIG. 4, when an input selection request 402 is detected by A/V receiver 102, it being understood that such a request may originate from controlling device 100 or elsewhere, for example from front panel controls of A/V receiver 102 itself, from other controlling devices, etc., at step 404 the receiver's current input source is switched to the requested device. At step 406, the device and key function assignments to be transmitted to controlling device 100 are configured to match the newly-selected input device and a representation of the controlling device 100 (e.g., displayed controlling device representation 302) is prepared for superimposition on video output 118 to a display, e.g., TV 104. It is then determined at step 408 whether the controlling device 100 is currently active. If not, i.e., the input selection request did not originate from the controlling device 100, a flag is set at step 410 which will serve to indicate that an updated appliance selection and set of key function assignments need to be provided to the controlling device the next time it becomes active, and A/V receiver 102 returns to wait mode, pending the next activity. If, however, the input selection request did originate from the controlling device 100, i.e., the controlling device 100 is active, the new appliance selection and key function assignments may be transmitted to the controlling device at step 412. Next, at step 414 the A/V receiver checks if a signal is detected from the selected source device. If no signal is detected, at step 416 a user prompt to power on the selected appliance may be displayed as further described hereafter in conjunction with FIG. 5.

Once a valid input signal from the selected source device has been verified, at step 418 the selected key layout display (e.g., displayed controlling device representation 302) is superimposed on the video output signal to TV 104, indicating to the user which appliance functions are currently assigned to each key of controlling device 100. The indicating can be in the form of labels/icons which depict the function to be controlled and which may further specifically indicate a device that is to perform the function when a key is activated.

Thereafter at steps 420,422 A/V receiver waits for an action to be received from the controlling device. In this context, it should be understood that in the embodiment described, whenever the user activates a key on controlling device 100, this will cause both a transmission 114 of an IR code appropriate for a designated appliance (e.g., appliance 106) which has been assigned to the activated key in the current controlling device configuration as well as an RF transmission 112 to the master appliance (e.g., appliance 102) indicating which key (e.g., key 1-18 of controlling device 702) has been pressed. In this manner, the master appliance may monitor controlling device activity, determine if alternate functionality is being requested, adjust and redisplay assigned key functions 302 based on commands being issued, e.g., substituting navigation keys for numeric pad functions when an appliance "menu" command is issued, issue a transmission to the controlling device 100 to reconfigure the controlling device 100, etc. If no activity is detected for ten seconds (or such other timeout as may be appropriate), the controlling device active flag may be cleared (step 424), the on-screen overlay display faded out (step 426) and A/V receiver 102 may return to wait mode, pending the next activity. If a transmission is received from controlling device 100 within the timeout period, it is first examined to determine if it represents activation of a "home" key (step 428) or an input selection key (step 430): if neither, any other indicated processing or actions required are performed at step 432 and thereafter A/V receiver waits for a further action to occur.

If it is determined that the "home" key 120 has been activated, the A/V receiver may reconfigure the on screen display overlay to represent its own key assignments (step 432) while also transmitting a null IR function configuration to controlling device 100, e.g., to prevent inadvertent operation of other appliances while the keys of the controlling device 100 are being used to command operation of the master appliance 102. A/V receiver 102 then waits to receive key activity as previously described. If it is determined at step 430 that an input selection key has been activated, this request is processed as a new input selection request as described above starting at step 404.

As a user first interacts with a quiescent controlling device, e.g. by picking it up or touching it, this may be detected by a motion or touch sensor 224 incorporated into the device and cause an "active" signal to be transmitted to the master appliance 102. When such a signal is received by the A/V receiver 102 at step 440, a "device active" flag may be set at step 442 (for subsequent checking at step 408). Thereafter, the "source appliance changed" flag may be checked at step 444. If the source appliance has not been changed since the previous interaction between A/V receiver 102 and controlling device 100, processing continues at step 414. If however, the source appliance has been changed in the interim, the flag is cleared at step 446 and processing continues at step 412, e.g., to cause the a new set of appliance function key assignments to be transmitted to controlling device 100. In either case however, user interaction with a quiescent controlling device will result in a re-display of the present key function assignments, thus confirming to the user what appliance commands will be issued upon activation of the various keys of the controlling device.

Figure 5:
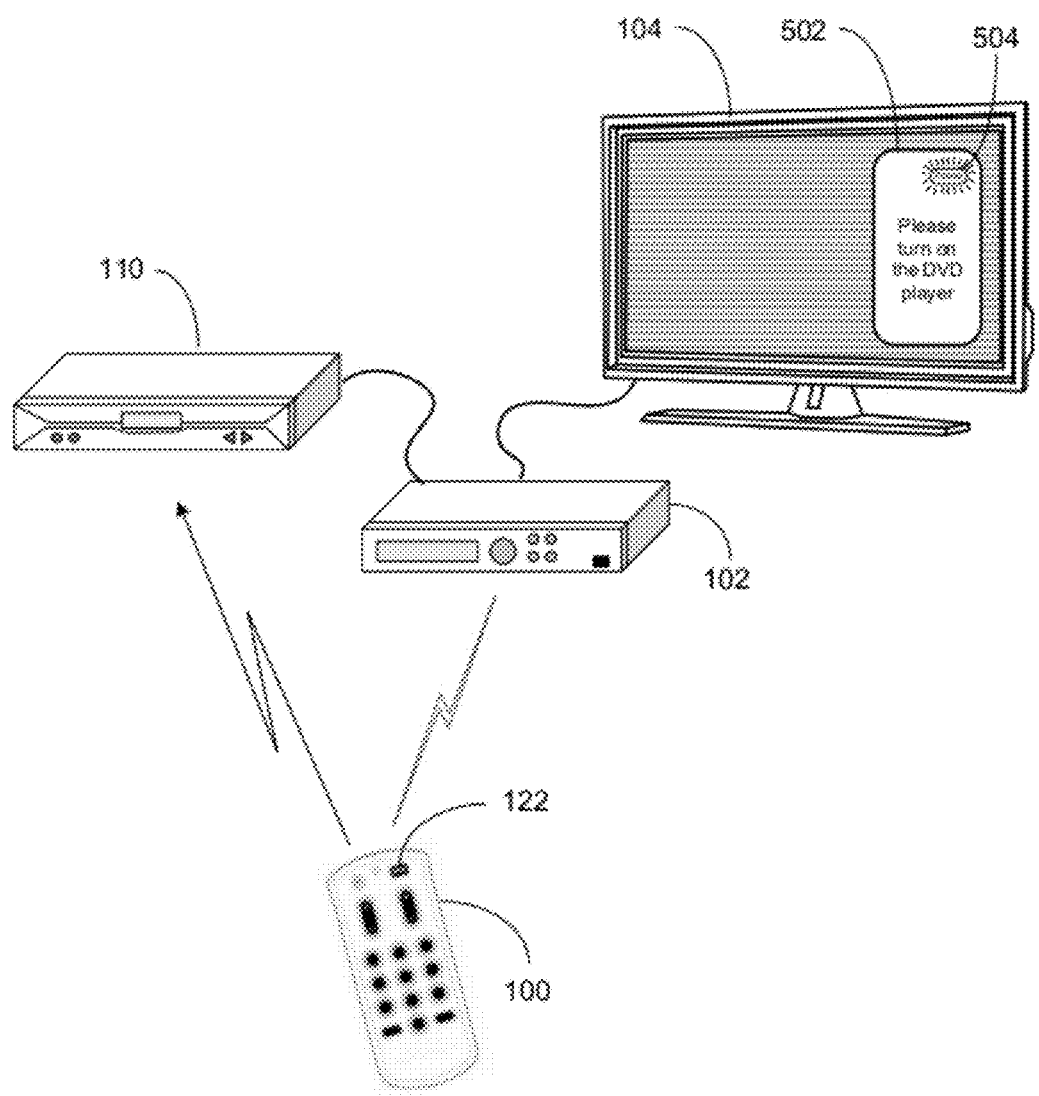
FIG. 5 illustrates the exemplary system of FIG. 1 in which a DVD player that is not currently powered on is selected as the A/V source device.
Figure 6:
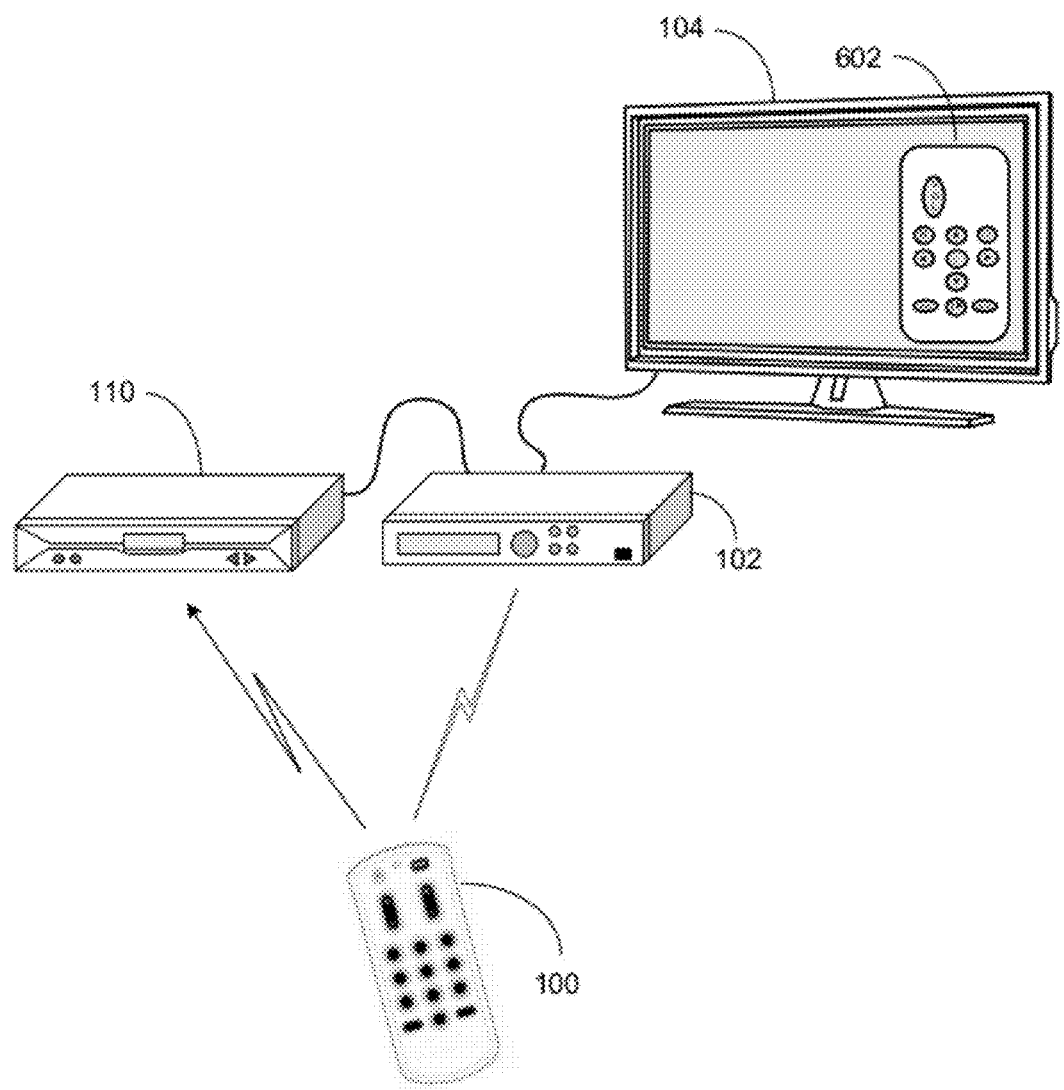
FIG. 6 illustrates the exemplary system of FIG. 5 after the DVD player has been successfully powered up.

In certain embodiments appliance operational status may be checked by the master appliance when an appliance is selected as the current source and/or when the controlling device reports itself to be in an active state. Turning now to FIG. 5, there is illustrated the system of FIG. 1 in which DVD player 110 has been selected by the user as the current input source of A/V content to A/V receiver 102. (Once again, for the sake of clarity, non-participating appliances not shown in this view.) If A/V receiver 102 detects that DVD player 110 is not currently powered on (e.g., by sensing the absence of a signal at step 414 of FIG. 4) the A/V receiver 102 may cause a special reminder display 502 to be superimposed on the video signal being delivered to TV set 104. This display may, for example, consist of an emphasized power key graphic 504 together with a message reminding the user to power on the selected appliance—it being appreciated that the A/V receiver has issued any appropriate transmissions to the controlling device 100 to allow this action to be performed via use of the controlling device as well as manually via interaction with the appropriate appliance itself. It will be appreciated that while illustrated in terms of a power state, any other detectable state may also form the basis for such a reminder function, e.g., a requirement to press "play," bring up a list of recorded content on a DVR, etc. It will be further appreciated that in cases where an appliance is capable of reporting other status to the master appliance, additional reminders may also be available, e.g. "insert disc," "subscription expired," etc. As illustrated in FIG. 6, once A/V receiver 102 detects that the user has performed the requested action, the reminder display may be replaced by the normal key function display overlay 602.

\* \* \* \* \*

While various concepts have been described in detail, it will be appreciated by those skilled in the art that various modifications and alternatives to those concepts could be developed in light of the overall teachings of the disclosure. For example, while described in the context of a hand-held controlling device such as a universal remote control, it will be appreciated that the control functionality described herein may be embedded in other portable devices such as cellular phones, PDAs, Web Tablets, personal communication devices, etc., all without departing from the spirit of the invention.

While presented in terms of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for providing proactive appliance control in a system comprised of a master routing device having an A/V input, and a controlling device configurable to transmit command communications, the method comprising:

receiving at the master routing device from the controlling device a signal;

causing the master routing device to respond to the signal by determining if a media input device that is currently associated with the A/V input of the master routing device is different than a media input device that was previously associated with the A/V input of the master routing device;

when the master routing device determines that the media input device that is currently associated with the A/V input of the master routing device is different than a media input device that was previously associated with the A/V input of the master routing device, causing the master routing device to transmit to the controlling device a first message having data indicative of the media input device that is currently associated with the A/V input of the master routing device;

causing the controlling device to use the data indicative of the media input device that is currently associated with the A/V input of the master routing device to automatically assign to a first input element of the controlling device a command code for controlling an operational function of the media input device that is currently associated with the A/V input of the master routing device; and causing the master routing device to determine if the media input device that is currently associated with the A/V input of the master routing device is currently in a desired operating state and, when the master routing device determines that the media input device that is currently associated with the A/V input of the master routing device is not currently in the desired operating state, causing an instruction to be displayed on a media rendering device wherein the instruction indicates at least one input element of the controlling device to activate to place the media input device that is currently associated with the A/V input of the master routing device into the desired operating state.

2. The method as recited in claim 1, wherein the first message having data indicative of the media input device that is currently associated with the A/V input of the master routing device is transmitted to the controlling device via a RF communication channel.

3. The method as recited in claim 1, comprising causing the master routing device to transmit to the controlling device a second message having data indicative of the media rendering device that is currently associated with an A/V output of the master routing device and, causing the controlling device to use the data indicative of the media rendering device that is currently associated with the A/V output of the master routing device to automatically assign to a second input element of the controlling device a command code for controlling an operational function of the media rendering device that is currently associated with an A/V output of the master routing device.

4. The method as recited in claim 1, comprising causing the master routing device to present on the media rendering device a representation of the controlling device in which a label is provided to a representation of the first input element of the representation of the controlling device and wherein the label indicates the operational function of the media input device that is currently associated with the A/V input of the master routing device that was automatically assigned thereto.

5. The method as recited in claim 4, wherein the instruction comprises highlighting at least one input element on the representation of the controlling device presented on the media rendering device.

6. The method as recited in claim 1, comprising causing the controlling device to transmit the signal to the master routing device in response to the controlling device exiting a quiescent state.

7. The method as recited in claim 1, comprising causing the controlling device to transmit the signal to the master routing device in response to the controlling device being touched.

8. The method as recited in claim 1, comprising causing the controlling device to transmit the signal to the master routing device in response to the controlling device being picked up.

9. The method as recited in claim 1, wherein the data indicative of the media input device that is currently associated with the A/V input of the master routing device comprises data indicative of an appliance category type for the media input device that is currently associated with the A/V input of the master routing device.

* * * * *